Figure 11:
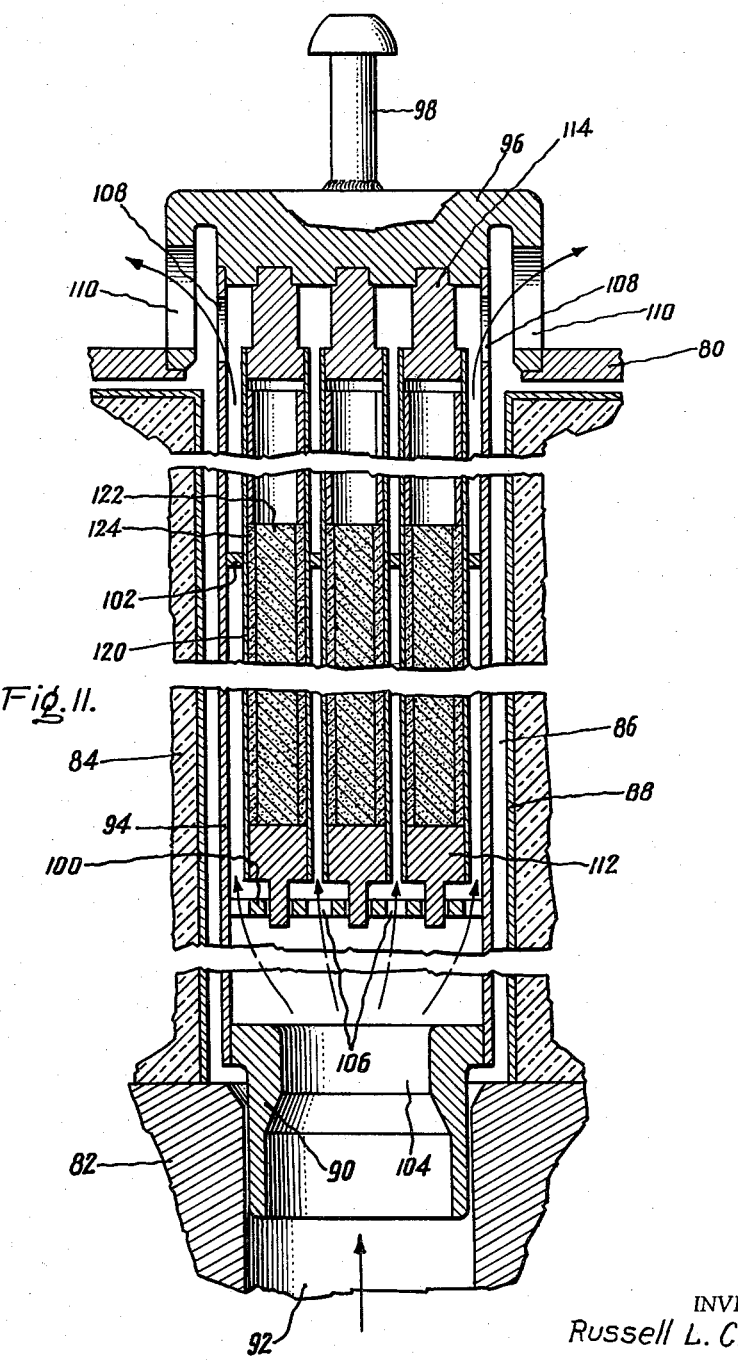

July 3, 1962 — R. L. CROWTHER — 3,042,598
SHIELDED THORIUM FUEL ELEMENT
Filed Oct. 3, 1960 — 2 Sheets-Sheet 1
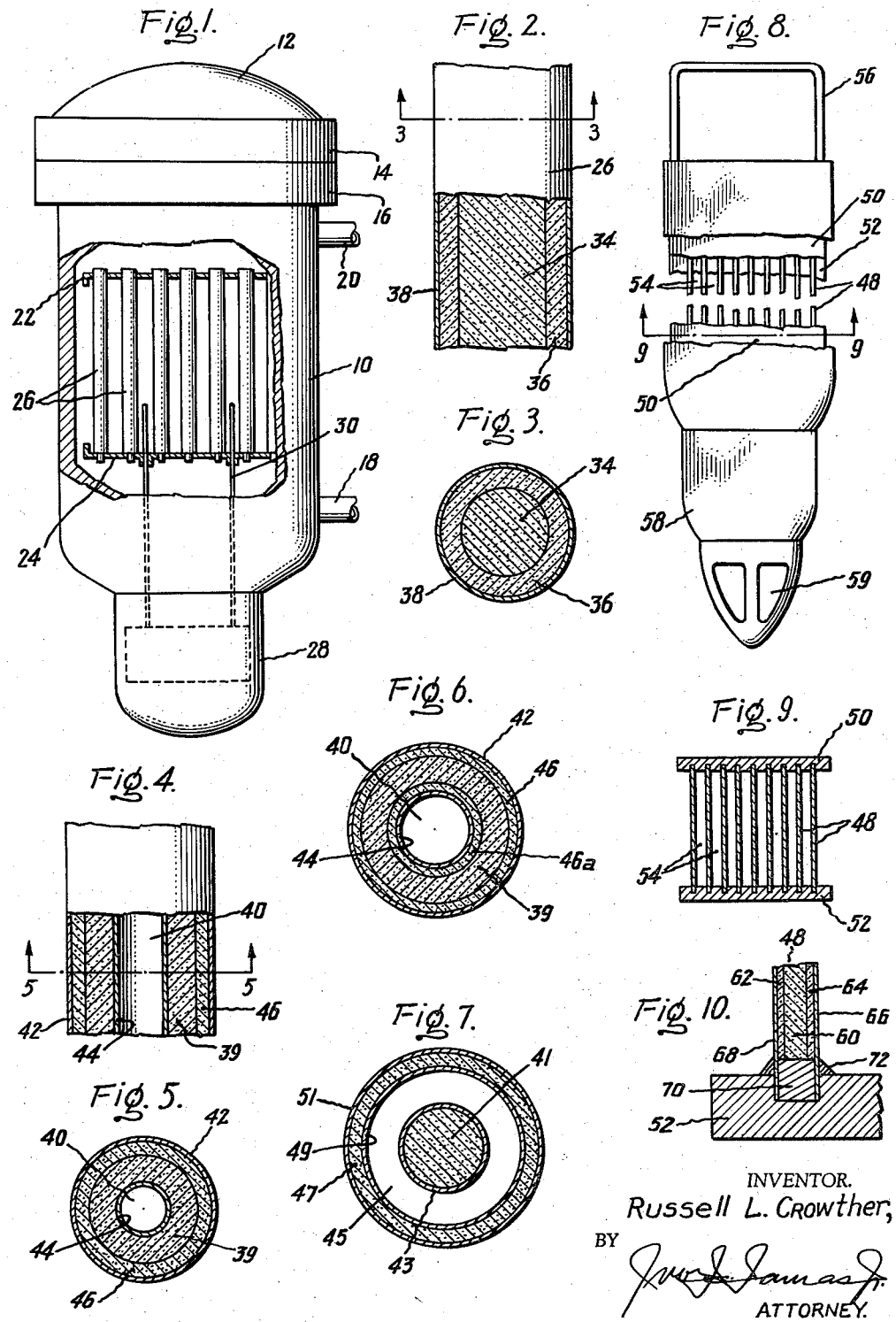
INVENTOR.
Russell L. Crowther,
BY
ATTORNEY.

INVENTOR.
Russell L. Crowther,
BY
ATTORNEY.

United States Patent Office 3,042,598
Patented July 3, 1962

3,042,598
SHIELDED THORIUM FUEL ELEMENT
Russell L. Crowther, Saratoga, Calif., assignor to General
Electric Company, a corporation of New York
Filed Oct. 3, 1960, Ser. No. 59,993
6 Claims. (Cl. 204—193.2)

This invention relates broadly to the conversion of mass to energy through certain nuclear reactions, and more particularly it relates to an improved nuclear fuel element for use in a nuclear reactor in which such reactions may be maintained.

The process of nuclear fission is now quite well known. Briefly, certain atoms such as $U^{233}$, $U^{235}$, and $Pu^{239}$ will undergo disintegration following capture of a neutron in their nuclei to produce two or more fission products of lower molecular weight, and a number of neutrons greater than one. The great kinetic energy of the fission products is quickly dissipated to varying degrees in any ambient material as heat. The net generation of neutrons forms the basis for a self-sustaining or chain fission reaction. The several types of nuclear reactors all involve the disposition of a form of fissionable material as a nuclear "fuel" in a reactor with provision for removing the heat liberated by flowing some kind of coolant through it, and provision for controlling the nuclear reaction and the energy liberation rate. As the reaction proceeds, the fissionable material is gradually consumed and deleterious fission products accumulate. Ultimately fresh fuel must be added, or reprocessing is required to separate fissionable material from the fission products.

The net addition of new fuel can be reduced, and in some cases eliminated, if the nuclear reaction can be made to produce from a "fertile" atom one net new fissionable atom per atom used up in the reaction. $Th^{232}$ and $U^{238}$ are such fertile atoms. Through neutron capture and a double beta particle decay $Th^{232}$ is converted to $U^{233}$ which is fissionable. Through the same mechanism $U^{238}$ is converted to $Pu^{239}$ which is also fissionable. The presence of these fertile materials in the nuclear fuel permits the conversion of non-fissionable atoms to fissionable atoms, thus varying degrees of regeneration of fuel can be effected simultaneously with consumption of the original fissionable charge.

Of the common fissionable isotopes, $U^{233}$, $U^{235}$, $Pu^{239}$, $Pu^{241}$, which can be produced by neutron capture in fertile isotopes, $Th^{232}$, $U^{234}$, $U^{238}$, $Pu^{240}$ respectively, $U^{233}$ has the most desirable nuclear properties. The nuclear properties of the fissionable isotopes are summarized in Table I.

TABLE I
*Some Properties of Common Fissionable Isotopes*

| Isotope | Average neutrons emitted per thermal neutron absorbed | Average neutrons emitted per resonance neutron absorbed |
|---|---|---|
| $U^{233}$ | 2.28 | 2.1 |
| $U^{235}$ | 2.07 | 1.7 |
| $Pu^{239}$ | 2.02 | 1.5 |
| $Pu^{241}$ | 2.18 | 2.0 |

The number of fast fission neutrons which are emitted as a result of neutron absorption in $U^{233}$ is greater than for any of the other common fissionable isotopes. It is also important that this quantity is greater for absorption of neutrons at both thermal and resonance, or slightly epithermal, neutron energies. There are, therefore, fundamental reasons for converting the fertile isotope, $Th^{232}$, to the fissionable isotope $U^{233}$.

The nuclear reactions involved in the conversion of $Th^{232}$ in a neutron flux are as follows:

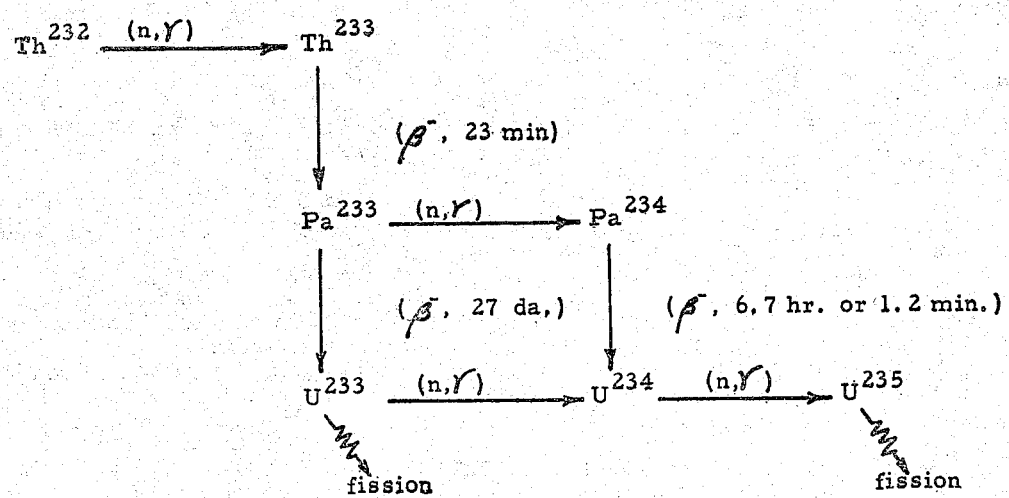

$Th^{232}$ by neutron capture becomes $Th^{233}$ which undergoes a $\beta$ particle decay to $Pa^{233}$. $Pa^{233}$ has a 27 day half-life and therefore may either decay to $U^{233}$ or may capture a neutron and go to $Pa^{234}$ during this period. The rate at which $Pa^{233}$ decays, relative to the rate at which it absorbs neutrons, strongly effects the efficiency of the nuclear reaction. In order to understand the process, and the disadvantages which are overcome by the present invention, it is necessary to follow each of the alternate paths of $Pa^{233}$ destruction in detail.

If $Pa^{233}$ decays to $U^{233}$ then the fissionable isotope $U^{233}$ may absorb a neutron and either fission or give off a gamma ray and transform to $U^{234}$. Each time $U^{233}$ absorbs a thermal neutron 2.28 fast fission neutrons are produced on the average. These are then free to be absorbed in the fertile or fissionable isotopes or in the structural materials in the reactor.

If, instead of decaying, $Pa^{233}$ absorbs a neutron, it is then transformed to $Pa^{234}$. Because of the short half-life of $Pa^{234}$, the probability that this isotope will absorb a neutron is very small and therefore virtually all of the $Pa^{234}$ that is produced, rapidly decays to $U^{234}$. $U^{234}$ is essentially non-fissionable and therefore it captures a neutron and is transformed to $U^{235}$. The isotope $U^{235}$ may then undergo fission; however, its nuclear properties are not as good as those of $U^{233}$.

Thus, effectively two neutrons were lost when $Pa^{233}$ absorbs a neutron and, in addition, $U^{235}$ which is less desirable than $U^{233}$ is the end product. If the difference between the $U^{233}$ and $U^{235}$ isotopes is taken into consideration then the total disadvantage when $Pa^{233}$ absorbs a neutron instead of decaying is approximately 2.2 neutrons. Obviously, when producing $U^{233}$ by neutron irradiation of $Th^{232}$, it is highly desirable to reduce neutron absorption in $Pa^{233}$.

Another problem associated with nuclear reactors in which $Th^{232}$ is employed as a fertile material relates to the large initial fissionable material requirements. The thermal neutron absorption cross section of $Th^{232}$ is 7 barns ($7 \times 10^{-24}$ cm.$^2$) as compared to 2.75 barns for $U^{238}$, the other most common fertile isotope. $U^{233}$ is not available except as produced from irradiation of $Th^{232}$ and, therefore, in the past it has been proposed that initially $U^{233}$ be produced by combining the fertile $Th^{232}$ with fully enriched $U^{235}$. Because of the high cost of producing $U^{235}$ in a diffusion plant and the reasonably large inventory which must be maintained before sufficient $U^{233}$ can be produced and recycled to reduce the makeup of $U^{235}$, this mode of operation imposes an economic and nuclear disadvantage on the conversion of $Th^{232}$ to $U^{233}$.

Therefore the present invention is directed to an improved solid nuclear reactor fuel element containing $Th^{232}$ as the fertile material and provided on at least one surface thereof with a neutron shield material serving to effect a substantial absorption of neutrons in the energy spectrum between 0.05 e.v. and 10.0 e.v. prior to the irradiation of $Th^{232}$ thereby. A neutron shield containing an isotope of Pu is effective, or if desired, a precursor of such an isotope such as $U^{238}$ may be used. The undesirable neutron capture by $Pa^{233}$ is substantially reduced.

It is accordingly a primary object of this invention to overcome the above-discussed problems and disadvantages in nuclear reactors employing $Th^{232}$ as fertile material for conversion to $U^{233}$.

Another object is to improve the method of converting $Th^{232}$ to $U^{233}$ by neutron irradiation.

It is a more specific object to provide an improved nuclear reactor fuel element comprising $Th^{232}$ as a fertile element which is shielded to minimize neutron absorption by $Pa^{233}$.

It is another object of this invention to shield $Th^{232}$ from irradiation by neutrons in the range of from 0.05 e.v. to 10.0 e.v., thereby substantially reducing $Pa^{233}$ capture.

It is an additional object of this invention to improve the breeding efficiency of $U^{233}$ from $Th^{232}$ in a nuclear reactor fuel element by shielding the $Th^{232}$ fertile material with selected materials hereinafter defined which are effective to reduce or eliminate neutron capture by $Pa^{233}$ generated in the fertile material.

Other objects and advantages of this invention will become apparent to those skilled in the art as the description and illustration thereof proceed.

Briefly, the present invention comprises a $Th^{232}$-containing fuel element suitable for neutron irradiation to produce $U^{233}$. The element is provided with an outer shield layer comprising a material which is either fertile or fissionable or a burnable control material, and which has a substantial neutron capture cross section for neutrons of energies in the range of from 0.05 to about 10.0 e.v. In thermal power reactor spectrums the thermal neutron energies are about 0.05 e.v. and below. The important resonance capture of the fertile isotopes $U^{238}$ and $TH^{232}$ lies above 10.0 e.v. Thus the shield material with resonances between 0.05 and 10.0 e.v. according to this invention substantially reduces $Pa^{233}$ capture, but neither decreases the resonance capture contribution to the conversion of fertile to fisionable isotopes which occurs above 10.0 e.v. in the fuel nor interferes with the fissionable materials in the fuel which occurs below 0.05 e.v.

The shielding material is preferably one, or a mixture of the isotopes of plutonium, specifically $Pu^{239}$, $Pu^{240}$, $Pu^{241}$. It is incorporated on or near the surface of the $Th^{232}$ fertile element, either in substantially pure form, or as a mixture with $Th^{232}$ or other isotopes.

A satisfactory alternate shield material comprises $U^{238}$. It may be either depleted of $U^{235}$, or it may be the natural mixture of uranium isotopes comprising 99.3 percent $U^{238}$, or it may be enriched with one of the fissionable uranium or plutonium isotopes. The principle behavior of $U^{238}$ in a neutron flux is as a precursor of Pu isotopes as follows:

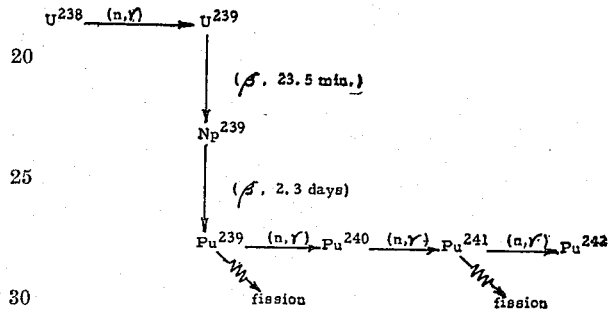

Thus, although $U^{238}$ itself will not provide the important shielding of the $Pa^{233}$ capture, the rapid buildup of the plutonium isotopes due to the neutron capture by $U^{238}$ will promptly provide the necessary shielding.

The quantity of the above-indicated shield material employed per unit mass of $Th^{232}$ in the fuel element is somewhat variable. It depends upon the fertile and fissionable isotopes which are present, the size of the fuel elements, and the neutron spectrum. The neutron spectrum depends on the first two variables and, in addition, depends on the type of moderator, the spacing of the fuel elements, the size of the reactor, the type of control elements, and the structural and poison materials which are in the reactor. Therefore, the neutron spectrum varies with time.

However, in general with thermal, resonance, or epithermal neutron breeder or convertor reactors and with plutonium shields, the quantity of plutonium varies between about 0.5 percent and about 20 percent by weight of the $Th^{232}$ present, the actual preferred amount depending upon the variables referred to above, and in addition, the temperature of the materials in the reactor and the chemical form, i.e., elemental or compounds form, of the fissionable and fertile materials in the fuel. The subsequently described examples indicate the degree of improvement which is obtained under various conditions with various quantities of the preferred plutonium shield.

It has been found that although the thermal neutron cross section of $Pa^{233}$ is only about 60 barns, its effective nuclear reactor cross section varies between 130 and 150 barns, depending upon the neutron energy spectrum of the reactor. Measurements indicate that the resonance integral of $Pa^{233}$ is about 670 barns. Thus the $Pa^{233}$ resonances lie at very low neutron energies in order that such a relatively low resonance integral has such a large effect upon the effective reactor neutron cross section.

The published measurements of the effective neutron capture cross section of $Pa^{233}$ have all been made in reactors with relatively low neutron temperatures, i.e., research or production reactors. Since power reactors must operate at high temperatures, the neutron temperatures in a power reactor are greater than in research or production reactors and, therefore, the effective thermal absorption cross section of $Pa^{233}$ is greater in a power reactor spectrum. Therefore, the absorption of neutrons by Pa$^{233}$ is more important in a power reactor than it is in a research or production reactor.

It is estimated that in a high flux nuclear power reactor, which has the most undesirable spectrum from the standpoint of high Pa$^{233}$ capture, the attainable integrated heat release per unit mass of fuel can be tripled if complete shielding of the Pa$^{233}$ is achieved. However, complete or maximum shielding of the Pa$^{233}$ absorption is not necessary as any amount of shielding is beneficial when compared to the case where no shielding exists. If fissionable plutonium is used as the shielding material, the maximum shielding which can be effected is limited by the maximum excess reactivity which can be incorporated in the reactor.

In the present invention, the Pu shield material adjacent to the surface of the fuel element and surrounding the Th$^{232}$ fertile material effectively absorbs from the neutron flux those neutrons in the 0.05 to 10.0 e.v. range which would otherwise be strongly absorbed by Pa$^{233}$ in the fertile interior of the fuel element. They are thus captured in the shield and produce fast fission neutrons which are not subject to useless resonance capture in Pa$^{233}$, but which are effective in the conversion of Th$^{232}$ to U$^{233}$. The Th$^{233}$ is thus permitted to decay through Pa$^{233}$ to U$^{233}$ without substantial neutron capture by the Pa$^{233}$. The conversion of Th$^{232}$ to a fissionable isotope of uranium, specifically U$^{233}$, and the neutron utilization efficiency are both markedly increased. This increase is due to a substantial reduction in the Pa$^{233}$ resonance capture due to the shielding effect.

The structure of fuel elements embodying the principles of this invention will be more readily understood by reference to the accompanying drawings in which:

FIGURE 1 is a schematic elevation view in partial cross section of a nuclear reactor vessel, FIGURE 2 is an elevation view in partial cross section of a typical reactor fuel rod having the neutron shield according to this invention.

FIGURE 3 presents a transverse cross section view of the fuel rod of FIGURE 2,

FIGURES 4 and 5 present the elevation and transverse section views of a shielded annular or tubular fuel element, FIGURE 6 shows a transverse view of a modification of the tubular fuel element having an internal and an external shield, FIGURE 7 is a similar view of another modification of this fuel element, FIGURES 8, 9, and 10 present views of a typical plate type fuel element having a neutron shield as herein disclosed, and FIGURE 11 is a foreshortened vertical cross section of a commercial scale fuel assembly using shielded ThO$_2$ fuel elements.

Referring now more particularly to FIGURE 1, a typical nuclear reactor 10 is shown in simplified form including the vessel head 12 attached by means of flanges 14 and 16. Coolant inlet and outlet 18 and 20 are also provided. Supported from the inner surface of vessel 10 by means not shown are upper and lower fuel element support grids 22 and 24, and supported therebetween are fuel elements 26, here shown as cylindrical rods. The fuel elements are spaced apart from one another to permit coolant to flow between them. Control rod housing 28 is attached to reactor 10 and contains the means for actuating control rods 30 which are movable into and out of the core.

In FIGURES 2 and 3, elevation and transverse section views of a rod type fuel element according to this invention are shown. This element corresponds to one of the fuel rods 26 of FIGURE 1. The inner portion 34 comprises the fertile material Th$^{232}$, the next outer surrounding layer 36 is the neutron shield, specifically plutonium, or U$^{238}$ which will produce plutonium on neutron irradiation. Surrounding the shield is cladding 38 serving to protect the fuel element from adverse effects of the coolant. Zirconium, zirconium alloys, stainless steel, aluminum are included as suitable cladding materials.

In FIGURES 4 and 5 are shown elevation and transverse section views of an annular or tubular type fuel element incorporating the neutron shield of this invention. It is provided with a tubular Th$^{232}$ element 39 having a central channel or opening 40 which is left open to reduce thermal stresses, or through which a non-moderating coolant such as sodium may be passed. On its outer and inner surfaces are provided cladding 42 and 44 respectively. Immediately inside the outer clad 42 is provided the neutron shield layer 46 which contains a substantial concentration of shielding material.

In FIGURE 6 is shown a transverse cross section of a fuel element of the tube type which is adapted to flow of a moderating coolant such as water. The only difference is that an additional shield layer 46a is provided just inside the inner clad layer 44, other parts being identical to those shown and described in connection with FIGURES 4 and 5.

In FIGURE 7 is shown a transverse cross section view of annular modification of fuel element in which a combination of rod and tubular elements are used to form the shielded fuel element. The inner Th$^{232}$ rod 41 is shown provided with clad 43. Channel 45 is open for flow of a non-modulating coolant such as sodium. The tubular shield layer 47 containing plutonium, or U$^{238}$, is disposed coaxially with respect to inner rod 41 and is provided with inner and outer claddings 49 and 51. Coolant may be passed around the outside surface of clad 51. This element is satisfactory for cases in which there is incentive, such as simplified fuel reprocessing, to keep the shield material separate from the fertile Th$^{232}$. Other corresponding mechanical arrangements such as alternating plates of fertile and fissionable materials can be used to achieve this effect.

In FIGURES 8 and 9 are shown detailed longitudinal and transverse section views of a typical plate type fuel element. The fuel plates 48 are secured at their edges between sides plates 50 and 52 and flow channels 54 are provided between adjacent fuel plates for passage of coolant or moderator if used. The plates are disposed parallel to one another, and although shown as flat plates in FIGURE 9, they may each be curved if desired. A handling loop 56 is provided to facilitate introduction and removal of the fuel element into and from the reactor core. A lower end fitting 58 with coolant orifice 59 is provided for alignment and support of the element in the core.

In FIGURE 10 is shown the structural detail of the fuel plate embodying the neutron shield of this invention. The innermost layer 60 containing Th$^{232}$ is shown between shield layers 62 and 64. The outer layers of cladding 66 and 68 are also shown. The edge 70 of the picture frame typical of this type of fuel element is provided and it is bonded physically, as by hot-rolling, to the cladding layers 66 and 68 to form a fluid-tight enclosure surrounding the fertile Th$^{232}$ layer and the shield layers. The fuel plate is finally secured to the side plate 52 by brazing or other suitable means, as indicated at 72.

There are several suitable procedures for manufacturing the plutonium shielded Th$^{232}$ fuel elements of the present invention, to some extent varying with the type of fuel element to be produced.

The rod-type fuel element of FIGURES 2 and 3 may be produced by powder metallurgy techniques, by physical bonding of an annular cylinder of shield material to an interior rod of Th$^{232}$, or by ceramic technology in which both the Th$^{232}$ and the shield material are in some ceramic form such as an oxide or carbide. These are well-known techniques. The clad is then added and provided with suitable end closures by usual methods of the art.

The annular type fuel element of FIGURES 4–7 may be produced by similar methods modified to provide the interior opening. For example, annular or tubular dies may be used in conjunction with die sleeves and annular liners to build up the respective layers prior to final heat treating. Again, the cladding and end closures may finally be added according to the conventional procedures.

The plate type fuel element shown in FIGURES 8, 9, and 10 may be produced by hot rolling three plates, the outer two of which are shield material, and the inner one of which is fertile $Th^{232}$, by powder metallurgy techniques, or by ceramic fabrication techniques. The inner layer of $Th^{232}$, with the adjacent layers of plutonium, or plutonium-enriched $U^{238}$, or natural or depleted $U^{233}$, may then be inserted in the picture frame of cladding material. Additional layers of clad are then added on each side of the shield layers, and then the entire assembly is hot rolled to bond the clad permanently to the frame forming a fluid-tight fuel plate.

Other procedures which may be conventional and known to those skilled in the art may be substituted to produce nuclear reactor fuel elements embodying the principles of this invention.

It should be understood that although rod and tubular fuel elements of circular cross section and plate type fuel elements of rectangular cross section have been described and illustrated, the principles of this invention are readily applicable to other structural shapes of nuclear fuel elements having different cross sectional configurations. For example, fuel elements having elliptical or oval or other noncircular cross sections can be employed. Similarly, fuel elements having geometric shape of a prism and bearing any polygonal cross section may also be employed. The invention is not limited to a reactor of the type illustrated in FIGURE 1.

Referring finally to FIGURE 11, a vertically shortened elevation view in cross section of a commercial scale fuel element assembly utilizing the principles of this invention is shown. This fuel assembly is adapted to high temperature operation, in the range of 1000°–1100° F., with liquid metal coolants such as sodium, sodium-potassium eutectic (NaK), etc., and a graphite or beryllium moderator. Sections of the upper and lower fuel assembly support plates 80 and 82 are shown respectively. Graphite moderator 84 provided with fuel channel 86 and cladding 88 surround the fuel assembly which extends vertically through the channel. The fuel assembly comprises lower coolant orifice fitting 90, seated in opening 92 in lower grid plate 82, structural tube 94 which acts also as the fuel assembly wall and as a coolant flow director surrounding the fuel elements, assembly lifting adapter 96 provided with lift fitting 98, typical fuel element support and spacer plates 100 and 102, and seven fuel elements arranged in a bundle of six surrounding a central element. The coolant enters through orifice 104 in fitting 90, flows through openings 106 in the lower spacer plate 100, upwardly around the fuel elements, through openings not shown in spacer 102 but similar to those in plate 100, and outwardly through openings 108 in structural tube 94 and openings 110 in lifting adapter 96.

The fuel elements in this modification are approximately 15 feet long and are supported between lower end fittings 112 and upper end fittings 114. The lower active fuel element is a solid rod 10 feet long. The exterior heat transfer surface is provided with a stainless steel cladding 120 which extends between lower end fitting 112 and upper end fitting 114.

The inner fertile portion 122 of this fuel element is a 0.40 inch diameter solid rod of sintered high density $Th^{232}O_2$. This is surrounded by the shield layer 124 0.12 inch thick and consists of a mixture of $U^{238}O_2$ containing 4 percent by weight of $Pu^{239}O_2$. This in turn is surrounded by the clad 120 which is stainless steel and 0.015 inch thick. The outside diameter of the fuel element is 0.67 inch. The center-to-center spacing of the fuel assembly elements is 0.81 inch. The outside diameter of flow channel 94 surrounding each assembly of seven fuel elements is about 2.50 inches.

This fuel assembly is typical of those in a reactor core having 510 such assemblies disposed in a hexagonal lattice which is 9.5 inches across the opposite faces, and has a 5.5 inch center-to-center assembly spacing. The moderator and reflector are composed of 270 hexagonal graphite blocks, 10 inches across the faces and having semicircular indentations or recesses along the corners to provide space for insertion of the fuel assemblies. The mean diameter of the core is 15.20 feet, the core height is 14.0 feet, the reflector thickness is about 2.0 feet, and the mean outer diameter of the core-reflector assembly is 18.47 feet. The fuel loading is 45,300 pounds total, distributed as 88.9 pounds in each fuel assembly of seven fuel elements each, each element containing 12.7 pounds of fuel. Liquid sodium coolant is circulated through this reactor at about 52,000 g.p.m., entering at about 700° F. and leaving at about 1000° F. The reactor rating is 200 mw. electrical.

The following data are given to illustrate the effect of the neutron shield of this invention upon the performance of a nuclear reactor having $Th^{232}$ as fertile material in the fuel elements. The reactor used as a basis for comparison is a typical sodium cooled, graphite moderated thermal power reactor using oxide fuel. It is operated at an effective neutron temperature of about 0.084 e.v. The fertile material in the fuel elements is $Th^{232}O_2$, the fissionable material being $U^{233}O_2$. The fuel elements are the rod type, approximately 0.6 inch in diameter, 10 feet long, and clad with stainless steel. The initial fuel to mixed oxide atom ratio in the core is 0.04, and the moderator to mixed oxide atom ratio is 20. The shield material used in these examples is a mixture of natural uranium oxide, which contains 0.72 percent $U^{235}$, and plutonium oxides. The additional plutonium isotopes rapidly build up during irradiation in amounts which are sufficient to reduce the effective $Pa^{233}$ capture cross section in the reactor from about 190 barns to an equivalent of about 46 barns. The effect of the neutron shielding of the $Pa^{233}$ containing fertile material on the integrated neutron multiplication factor at various neutron fluxes and various extents of fuel irradiation are shown below in Table II.

TABLE II

*Variation in Multiplication Factor, k*

| Extent of irradiation mwd./t. | Flux $1 \times 10^{13}$ | | Flux $1 \times 10^{14}$ | | Flux $4 \times 10^{14}$ | |
|---|---|---|---|---|---|---|
| | Shield | No shield | Shield | No shield | Shield | No shield |
| 0 | 1.128 | 1.128 | 1.128 | 1.128 | 1.128 | 1.128 |
| 2,000 | 1.123 | 1.120 | 1.118 | 1.110 | 1.116 | 1.110 |
| 4,000 | 1.121 | 1.116 | 1.109 | 1.100 | 1.105 | 1.095 |
| 6,000 | 1.119 | 1.114 | 1.103 | 1.092 | 1.094 | 1.080 |
| 8,000 | 1.117 | 1.112 | 1.098 | 1.085 | 1.083 | 1.066 |
| 10,000 | 1.115 | 1.110 | 1.093 | 1.080 | 1.073 | 1.051 |

At a flux of $1 \times 10^{13}$, the $Pa^{233}$ exerts very little influence upon the change in multiplication factor $k$. However, at higher neutron fluxes the absorption of neutrons in $Pa^{233}$ becomes increasingly important. The difference between the $k$ values for fluxes of $1 \times 10^{13}$ and $4 \times 10^{14}$ is due to the adverse effect of $Pa^{233}$. Comparison of the $k$ values for unshielded fuel elements with those for the shielded fuel elements of this invention shows that the shielding effect is relatively small at low thermal neutron fluxes, but is very appreciable at higher fluxes. At a neutron flux of $4 \times 10^{14}$, the reactor with a shielded fuel elements has approximately a 2.0 percent reactivity advantage at 10,000 mwd./t. over the same reactor with unshielded elements. This amount of reactivity is particularly important to increase the reactor lifetime at long fuel irradiations. The reactivity advantage of neutron shielding the $Th^{232}$ fertile material according to this invention is clearly shown.

The following data show the gain in discharge cycle conversion ratio (D.C.R.) i.e., the number of fissionable atoms produced per fissionable atom destroyed at 10,000 mwd./t. irradiation, with variation in neutron flux and showing the effect of fertile material shielding according to this invention. Again the shielding improvements are more pronounced at higher neutron fluxes.

TABLE III
*Variation in D.C.R.*

| Neutron flux | Shield | No shield |
|---|---|---|
| $1 \times 10^{13}$ | 0.705 | 0.700 |
| $4 \times 10^{13}$ | 0.715 | 0.697 |
| $1 \times 10^{14}$ | 0.723 | 0.695 |
| $4 \times 10^{14}$ | 0.734 | 0.688 |

The improvement in conversion ratio at an average neutron flux of $4 \times 10^{14}$ is 5 percent at 10,000 mwd./t. Although the above data relate to fuel elements provided with a shield composed of natural uranium enriched with plutonium according to this invention, an improvement is also realized when the shield is made up of depleted uranium and plutonium, depleted uranium and $U^{233}$, or natural uranium slightly enriched with $U^{235}$.

The shielded $Th^{232}$ fuel elements of this invention have been found to provide another distinct advantage over unshielded $Th^{232}$ fuel elements, and this involves the change in reactivity with time. A $U^{238}$ converter provides an initial increase in reactivity after startup due to the relatively rapid buildup of $Pu^{239}$ with its high fission cross section. This is followed, however, by a decline due to saturation of the plutonium production, burnup of fuel, and buildup of fission products. The $Th^{232}$ converter initially started on $U^{235}$ exhibits an initial decrease in reactivity due to fuel burnup and buildup of fission products during the time in which the $Pa^{233}$ is slowly building up. This is followed first by a slight reactivity increase due to buildup of $U^{233}$ with its higher value of $\eta$, and then a gradual decrease due to saturation of the $U^{233}$ production and buildup of fission products. Therefore, a blending of $U^{238}$ and $Th^{232}$ as fertile materials in the initial fuel load effectively balances these reactivity change effects against one another and permits longer term irradiations. In addition, such blending decreases the initial fuel inventory requirements because of the lower thermal neutron cross section of $U^{238}$. Subsequent fuel loadings each have successively higher $Th^{232}$ concentrations so that finally $Th^{232}$ is the primary fertile material. During the continuance of the full cycle the initial $U^{235}$ is burned up and the $U^{233}$ and plutonium which are produced are separated and recycled to supply the required fissionable material. Thus, two additional advantages are realized; the initial inventory requirements of fissionable material which are required to reach the equilibrium recycle condition are reduced, and the initial cost of $U^{235}$ is decreased since it is not required to separate the $U^{235}$ from $U^{238}$ in a diffusion plant. The shielded fuel element according to this invention provides analogous improvements in reactivity and average conversion ratio to such mixed $Th^{232}$—$U^{238}$ fuels as it does to the $Th^{232}$ fuels discussed above.

In addition to $U^{238}$ and the fissionable plutonium isotopes described above, other fissionable or fertile isotopes, including $Np^{237}$, $Np^{238}$, $Pu^{240}$, and $Am^{241}$ are effective shield materials for the purposes of this invention. The following examples illustrate the use of these materials in a nuclear reactor fuel assembly and a reactor of the types and dimensions described above in FIGURE 11.

EXAMPLE 1

A fuel rod incorporating $Np^{237}$ as shielding material may be fabricated having a sintered high density solid rod containing 92% $Th^{232}O_2$ and 4% beryllium oxide and 4% $UO_2$. The rod is 0.4 inch in diameter. The shield layer surrounding this rod is 0.12 inch thick and contains 18% (atom percent) $U^{235}O_2$, 74% $U^{238}O_2$, and 8% of an oxide of $Np^{237}$.

EXAMPLE 2

On neutron irradiation of the fuel rod described above in Example 1, the $Np^{237}$ is transformed by neutron capture to $Np^{238}$. Although this neptunium isotope has a fairly short half-life, it provides additional shielding of $Pa^{233}$ according to the principles of this invention and also serves as a fissionable material.

EXAMPLE 3

A nuclear fuel element utilizing $Pu^{240}$ as the shield material according to this invention may be prepared having a $Th^{232}C_2$ central core of 0.4 inch in diameter. This core is surrounded by the shield layer, 0.08 inch thick, and contains 19% $U^{235}$, 80.5% $U^{238}$, and 0.5% of $Pu^{240}$ present as a metallic foil.

EXAMPLE 4

A nuclear fuel element utilizing $Am^{241}$ as a neutron shield according to this invention may be prepared having a $Th^{232}C_2$ central core 0.4 inch in diameter surrounded by a 0.12 inch thick shield layer containing 18.5% $U^{235}$ carbide, 79.0% $U^{238}$ carbide, and 2.0% $Am^{241}$ carbide.

Other satisfactory alternate, although temporary, shielding materials which can be used are burnable control poisons. These poisons burn out as reactor irradiation continues and thus serve to control and shield the reactor temporarily. The most suitable of these are poisons which have neutron absorption resonances just above thermal neutron energies which are large compared to their thermal neutron cross sections. Applicable poison materials which meet this requirement include In, Te, Ru, Ag, Cd, Cs, Sm, Eu, Dy, Ho, Er, Tm, Hf, Ta, Re, Ir, and Au. However, it should be noted that this type of shielding material is not equivalent to the fissionable or fertile U and Pu isotope shielding described above because its shielding effect decreases with fuel irridiation and because the $Th^{232}$ conversion may be decreased. Nevertheless, in some applications this type of combined initial reactivity control and fertile elements shielding is required in the reactor.

The following examples illustrate the utilization of burnable control poisons as $Pa^{233}$ shields in fuel elements embodying the principles of this invention. In each case, the fuel element comprises a $Th^{232}O_2$ core 0.4 inch in diameter surrounded by a shield layer 0.12 inch thick containing the shield material noted in an appropriate form. The 4% $Th^{232}O_2$ is added to the shield layer to improve its material properties, including its compatibility with the $Th^{232}O_2$ core portion. The data are presented in tabular form in view of the relatively large number of poison materials.

TABLE IV
*Example Burnable Poison Shields*

| Example No. | Burnable poison | Shield layer composition—Atomic percent | | | |
|---|---|---|---|---|---|
| | | $U^{235}O_2$ | $U^{238}O_2$ | $Th^{232}O_2$ | Shield |
| 5 | In | 19.3 | 76.0 | 4.0 | 0.6 |
| 6 | Te | 16.2 | 64.8 | 4.0 | 15.0 |
| 7 | Ru | 18.0 | 74.0 | 4.0 | 4.0 |
| 8 | Ag | 18.7 | 74.3 | 4.0 | 3.0 |
| 9 | Cd | 19.2 | 76.6 | 4.0 | 0.2 |
| 10 | Cs | 16.2 | 64.8 | 4.0 | 15.0 |
| 11 | Sm | 19.2 | 76.76 | 4.0 | 0.04 |
| 12 | Eu | 19.2 | 76.76 | 4.0 | 0.04 |
| 13 | Dy | 18.4 | 73.9 | 4.0 | 3.7 |
| 14 | Ho | 17.0 | 68.0 | 4.0 | 11 |
| 15 | Er | 18.0 | 70.0 | 4.0 | 8 |
| 16 | Tm | 18.9 | 75.4 | 4.0 | 1.7 |
| 17 | Hf | 18.8 | 75.2 | 4.0 | 2.0 |
| 18 | Ta | 19.0 | 75.8 | 4.0 | 1.2 |
| 19 | Re | 18.3 | 73.4 | 4.0 | 4.3 |
| 20 | Ir | 18.8 | 75.2 | 4.0 | 2.0 |
| 21 | Au | 19.0 | 76.0 | 4.0 | 1.0 |

It should be understood that either the shield element or the fertile element can be a slurry such as a mixture of sodium and a metallic fissionable or fertile oxide, or a fluid such as a molten alloy or salt of a solution of fissionable or fertile material. Both elements may be such non-solid materials in the presence of suitable structural or containment materials at the boundary between the elements. The drawings show suitable geometries and indicate these boundaries.

This application is a continuation in part of applicant's copending application, Serial No. 723,709, filed March 25, 1958 and entitled "Shielded Thorium Fuel Element," now abandoned.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A fuel element for use in a nuclear reactor which comprises an inner fertile portion comprising $Th^{232}$ which is converted at least in part to $U^{233}$ by neutron irradiation, and an outer portion comprising a neutron shield material selected from the class consisting of $Np^{237}$, $Np^{238}$, and $Am^{241}$ and having strong neutron resonances in the range of from about 0.05 e.v. to about 10.0 e.v. to absorb from the neutron flux neutrons of energies in this range and substantially reduce neutron capture in $Pa^{233}$ present during the conversion.

2. A fuel element for use in a nuclear reactor which comprises an inner fertile portion comprising $Th^{232}$ which is converted at least in part to $U^{233}$ by neutron irradiation, and an outer portion comprising a neutron shield material which is temporary and burns out as irradiation of said fuel element continues, and is selected from the class consisting of In, Te, Ru, Ag, Cd, Cs, Sm, Eu, Dy, Ho, Er, Tm, Hf, Ta, Re, Ir, and Au and having strong neutron resonances in the range of from about 0.05 e.v. to about 10.0 e.v. to absorb from the neutron flux neutrons of energies in this range and substantially reduce neutron capture in $Pa^{233}$ present during the conversion.

3. In the irradiation of $Th^{232}$ in a neutron flux to produce $U^{233}$, the improvement which comprises passing the neutrons through a neutron shield material selected from the class consisting of $Np^{237}$, $Np^{238}$, and $Am^{241}$ and having a substantial neutron resonance capture cross section for neutrons of energies in the range of from 0.05 to about 10.0 e.v. to effect a substantial absorption from said flux of neutrons in this energy spectrum prior to the irradiation of the $Th^{232}$ by said flux.

4. In irradiation of $Th^{232}$ in a neutron flux to produce $U^{233}$, the improvement which comprises passing the neutrons through a neutron shield material which is temporary and burns out as irradiation of said fuel element continues and is selected from the class consisting of In, Te, Ru, Ag, Cd, Cs, Sm, Eu, Dy, Ho, Er, Tm, Hf, Ta, Re, Ir, and Au and having a substantial neutron resonance capture cross section for neutrons of energies in the range of from 0.05 to about 10.0 e.v. to effect a substantial absorption from said flux of neutrons in this energy spectrum prior to the irradiation of $Th^{232}$ by said flux.

5. A fuel element for use in a nuclear reactor which comprises an inner fertile portion comprising $Th^{232}$ which is converted at least in part to $U^{233}$ by neutron irradiation, and an outer portion comprising $Pu^{240}$ as a neutron shield material having strong neutron resonances in the range of from about 0.05 e.v. to about 10.0 e.v. to absorb from the neutron flux neutrons of energies in this range and substantially reduce neutron capture in $Pa^{233}$ present during the conversion.

6. In the irradiation of $Th^{232}$ in a neutron flux to produce $U^{233}$, the improvement which comprises passing the neutrons through a neutron shield material comprising $Pu^{240}$ having a substantial neutron resonance capture cross section for neutrons of energies in the range of from 0.05 to about 10.0 e.v. to effect a substantial absorption from said flux of neutrons in this energy spectrum prior to the irradiation of the $Th^{232}$ by said flux.

No references cited.

UNITED STATES PATENT OFFICE
CERTIFICATE OF CORRECTION

Patent No. 3,042,598            July 3, 1962

Russell L. Crowther

It is hereby certified that error appears in the above numbered patent requiring correction and that the said Letters Patent should read as corrected below.

Column 1, line 63, for "$Pu^{238}$" read -- $Pu^{239}$ --; column 4, line 2, for "fisonable" read -- fissionable --; same column 4, line 3, after "with" insert -- thermal neutron flux which maintains thermal fission of --; column 11, line 3, for "of", first occurrence, read -- or --.

Signed and sealed this 6th day of November 1962.

(SEAL
Attest:

ERNEST W. SWIDER            DAVID L. LADD
Attesting Officer            Commissioner of Patents